(12) United States Patent
Ulvenes et al.

(10) Patent No.: US 7,664,832 B1
(45) Date of Patent: Feb. 16, 2010

(54) RF DATA CHANNEL API FOR MOBILE STATION CLIENT APPLICATIONS

(75) Inventors: Randy Ulvenes, Olathe, KS (US); Dale Knoop, Leawood, KS (US); Kevin O'Conner, Rocklin, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 569 days.

(21) Appl. No.: 10/961,764

(22) Filed: Oct. 8, 2004

(51) Int. Cl.
*G06F 15/16* (2006.01)

(52) U.S. Cl. ............... 709/219; 709/218; 709/223; 709/230; 370/335; 370/338; 370/252; 705/71

(58) Field of Classification Search ........... 370/330, 370/338, 252; 705/71; 709/218, 223, 230
See application file for complete search history.

(56) References Cited

U.S. PATENT DOCUMENTS

| | | | |
|---|---|---|---|
| 6,442,603 B1 * | 8/2002 | Borella | 709/218 |
| 6,996,085 B2 * | 2/2006 | Travostino et al. | 370/338 |
| 2002/0080744 A1 * | 6/2002 | Ozluturk | 370/335 |
| 2002/0080754 A1 * | 6/2002 | Travostino et al. | 370/338 |
| 2002/0128984 A1 * | 9/2002 | Mehta et al. | 705/71 |
| 2003/0231655 A1 * | 12/2003 | Kelton et al. | 370/468 |
| 2004/0081183 A1 * | 4/2004 | Monza et al. | 370/412 |
| 2004/0090924 A1 * | 5/2004 | Giaimo et al. | 370/252 |
| 2004/0255019 A1 * | 12/2004 | Jardin et al. | 709/223 |
| 2004/0267611 A1 * | 12/2004 | Hoerenz | 705/14 |
| 2006/0174021 A1 * | 8/2006 | Osborne et al. | 709/230 |

* cited by examiner

*Primary Examiner*—Thanh Tammy Nguyen

(57) ABSTRACT

A method of optimizing data transmissions to a wireless device is provided. In particular, a client application may discover the data rate of the wireless connection, and provide that information to a media server. The media server may then provide content to the application over the wireless connection, where the level of media detail provided is best suited for transmission at the available data rate.

15 Claims, 5 Drawing Sheets

RF DATA CHANNEL API FOR MOBILE STATION CLIENT APPLICATIONS

BACKGROUND

A. Field of Invention

The present invention is related to wireless communication systems, and more particularly, to a method of providing information relating to the radio channel data rate to the wireless multimedia application client and/or a multimedia server. It is particularly useful in customizing the type of data made available to a wireless user based on the available data channel data rate to thereby enhance the quality of the data service as well as the wireless user's experience.

B. Description of Related Art

In existing CDMA wireless networks, client programs (e.g., streaming multimedia, web browsing, MMS, digital imaging, J2ME) on mobile wireless devices do not have any information about the current data rate provided by the RF (radio frequency) channel on the radio network. The client may attempt to use the highest data rate possible, even if it exceeds the RF data channel that has been provisioned for the present data session. Some client applications, such as FTP (file transfer protocol) and web browsing using http (hyper-text transfer protocol), may benefit from data rate throttling since they use IP Transmission Control Protocol, which adjusts the server transmission rate to the mobile device based on acknowledgement messages.

Streaming multimedia servers employ both fixed rate streaming and variable bit rate streaming. With fixed rate streaming, the server will attempt to send the data at a predetermined fixed rate. This may underutilize the current network capabilities or exceed the current network capabilities. Variable bit rate streaming first tries to send as much data as possible, and continues to do so until it receives data flow messages from the client. The client monitors the data and determines if the server should increase its transmission data rate or slow down the transmission data rate. The client may then send a message to the server to take the appropriate action (speed up or slow down). The multimedia server will use this information to speed up the data rate or slow down the data rate. Due to long client-server messaging delays and unpredictable mismatches between server transmission rates and available radio network capacity, these prior art data rate control mechanisms often result in an inconsistent and dissatisfying multimedia experience for the user.

Even if a radio network has some type of Quality of Service (QoS), the problem still arises that the application does not know what the QoS capabilities of the radio are, or how to adjust the application to best utilize the current QoS. Consequently, a method of providing data over a wireless connection that overcomes the current limitations is needed.

SUMMARY

A method of optimizing data transmissions to a wireless device is provided. In particular, a client application may discover the data rate of the wireless connection, and provide that information to a media server. The media server may then provide content to the application over the wireless connection, where the level of media detail provided is best suited for transmission at the available data rate.

In a preferred embodiment, the wireless device establishes a radio frequency connection at a data rate. Information indicative of the data rate is then provided to a client application. The client application then transmits the data rate information to a media server, and the media server then provides media content to the wireless device, where the media content is based in part on the data rate information.

The method preferably includes querying an application program interface associated with a communication protocol stack of the wireless device in order to obtain the data rate information. The data rate information may have been obtained by the communication protocol stack directly from a baseband resource manager that controls the baseband transceiver of the wireless device. In some embodiments, the communication protocol stack may include a protocol to negotiate a desired QOS (quality of service). The QOS protocol component may then provide the data rate information.

In an alternative embodiment, the data rate information for the radio frequency connection may be obtained from the base transceiver station. In this embodiment, the wireless device transmits a data rate query message from the communication protocol stack to a base station transceiver messaging entity, and then receives a response message containing the data rate information.

The preferred method then provides the data rate information to a client application, such as by the communication protocol stack returning a data rate value to the client application in response to the query.

The application program is then able to provide the data rate information to a media server. The media server is then able to provide content to the wireless device by selecting one of a plurality of media types in response to the data rate information. Exemplary media types include AM radio quality audio, FM radio quality audio, and CD quality audio. Alternatively, the media types may be video having a frame rate of less than five frames per second and video having a frame rate of greater than five frames per second. Further alternatives may include video slides, video having a frame rate of between five and ten frames per second, and video having a frame rate of greater than ten frames per second.

In one embodiment, the method may include negotiating a data rate to be used on a radio channel based on the requirements of an application program. In this embodiment, the method may be characterized by the steps of (i) initializing an application on a wireless device; (ii) determining a desired data rate to support the application; (iii) providing data rate information indicative of the desired data rate to a communication protocol stack; (iv) the communication protocol stack responsively establishing a radio connection using a radio transceiver at an available data rate nearest to the desired data rate; (v) providing data rate information indicative of the available rate at which the radio connection was established to the application; (vi) transmitting the data rate information to a media server; and, (vii) providing media content to the wireless device, wherein the media content is based in part on the data rate information.

These as well as other features and advantages of the present invention will become apparent to those of ordinary skill in the art by reading the following detailed description, with appropriate reference to the accompanying drawings.

BRIEF DESCRIPTION OF FIGURES

Reference is made to the attached drawings, wherein elements that have the same reference numeral designations represent like elements throughout and wherein.

DETAILED DESCRIPTION OF EXEMPLARY EMBODIMENTS

Figure 1:
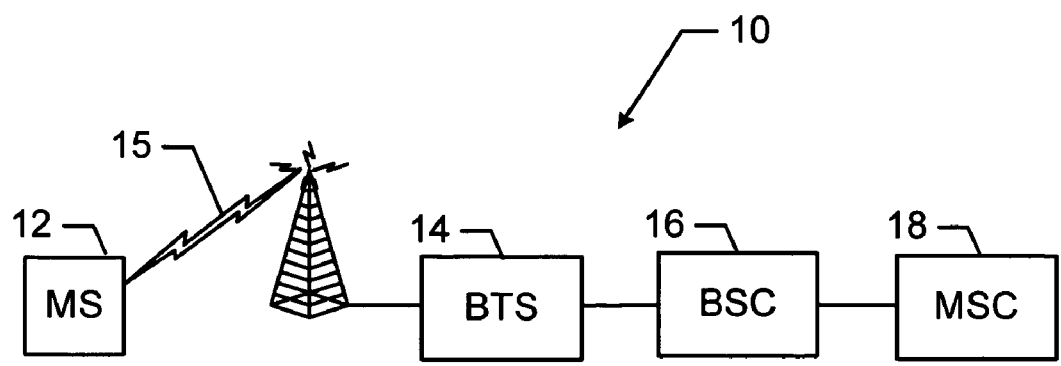
FIG. 1 is a block diagram illustrating one embodiment of a wireless communication system.

A typical wireless communication system 10 is shown in FIG. 1. Mobile station 12 communicates with the mobile switching center 18 (MSC) via base transceiver station 14 (BTS), radio air interface 15, and base station controller 16 (BSC). The system 10 preferably incorporates a mechanism to provide a designated level of quality of service. Such mechanisms are described in U.S. patent application entitled "Method and System for Facilitating End-To-End Quality of Service in a Wireless Packet Data System," Ser. No. 09/927, 816, filed Aug. 10, 2001, the contents of which are incorporated herein by reference.

Figure 2:
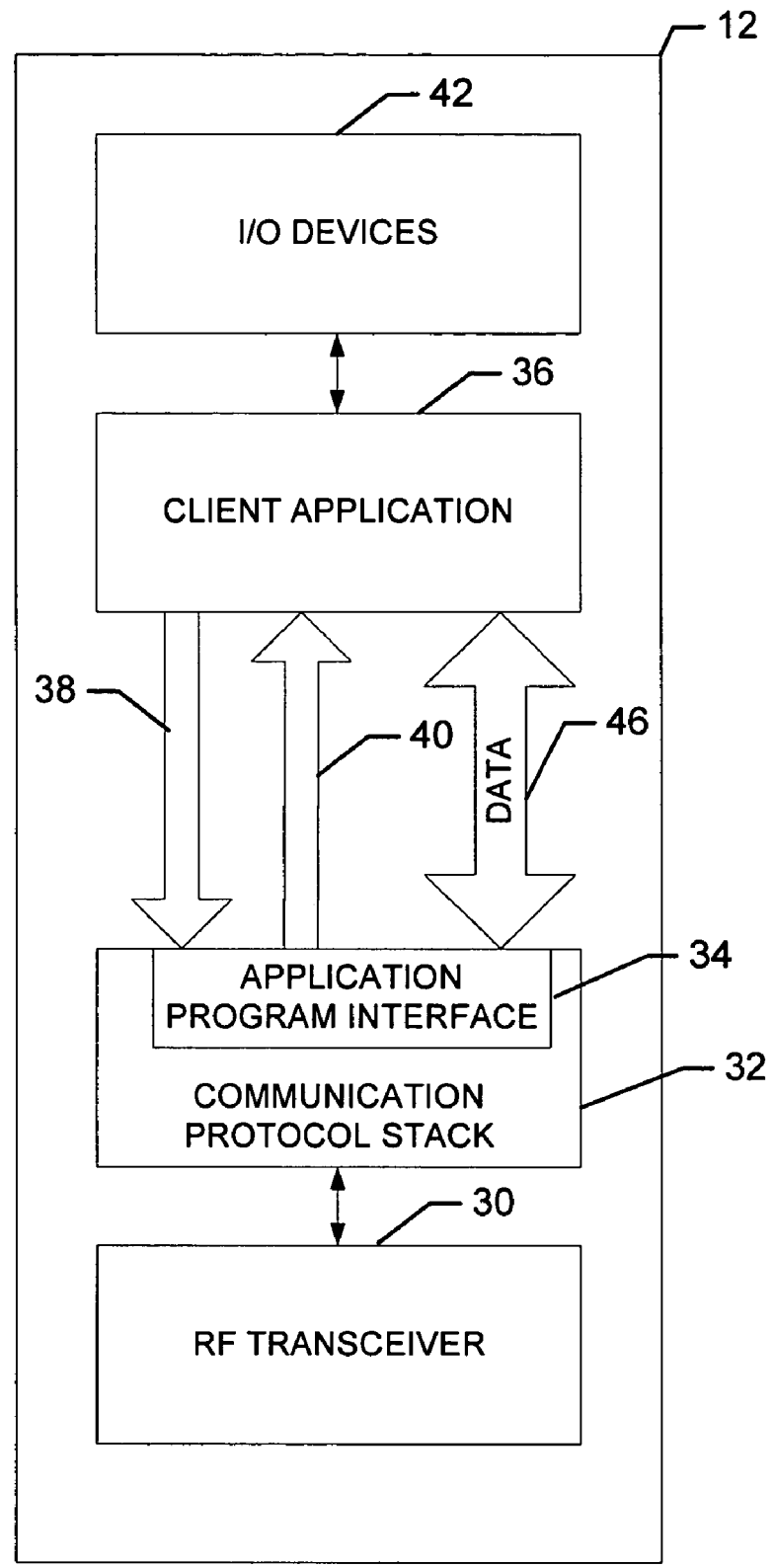
FIG. 2 is a block diagram of a preferred device used for optimizing data transmissions over a wireless connection; and, FIGS. 3, 4 and 5 illustrate preferred methods of optimizing data transmissions to a wireless device.

With reference to FIG. 2, the mobile device 12 includes a radio transceiver 30, a communication protocol stack 32 including an application program interface 34, and at least one application program 36. The application program 36 includes a data rate query function 38, and the communication protocol stack 32 includes a data rate response function 40. These functions provide the exchange of data rate information that permits either the client or the server to optimize the data flow.

The radio transceiver 30 establishes a radio connection with the BTS 14. In one preferred embodiment, the RF transceiver is a CDMA transceiver. Alternatively, the radio network may be a GSM system, in which case a GSM transceiver is used. The connection may be established at one of a number of different available data rates.

The communication protocol stack 32 generally controls the radio transceiver 30. It includes protocols for establishing the air interface connection. In addition, the communication protocol stack 32 includes an application program interface 34. The application program interface 34 includes a data rate response function 40 to provide data rate information indicative of the data rate of the established connection. The application program 36 includes a data rate query function 38 to request data rate information from the communication protocol stack 32.

The client application program 36 communicates with a media server via a data flow 46 to the application program interface 34, which forwards the data over the established radio connection using the RF transceiver 30. The client application program 36 may be a streaming video player, a streaming audio player, or other user application.

Figure 3:
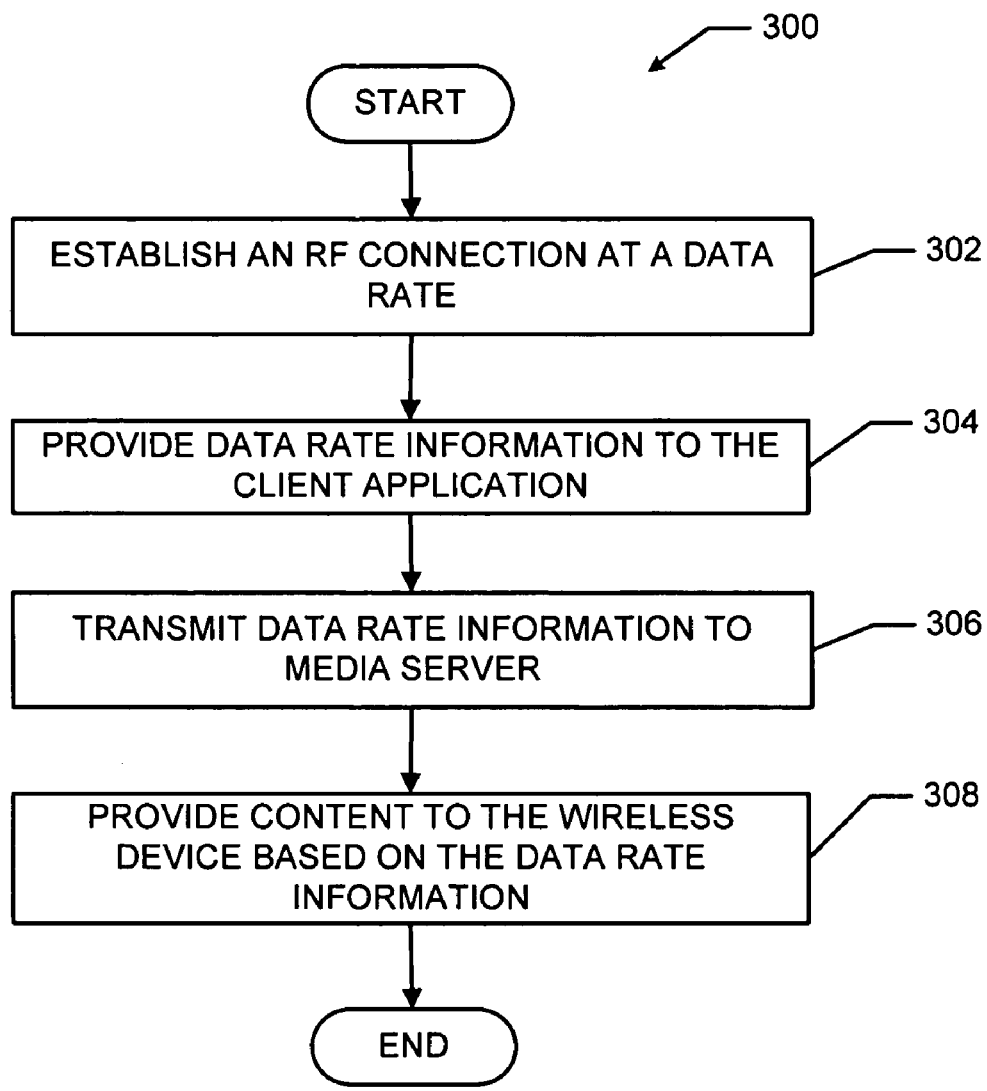

With reference to FIG. 3, a preferred method 300 of optimizing data transmissions to a wireless device is described. At step 302, the wireless device establishes a radio frequency connection at a data rate. The information indicative of the data rate is then provided to the client application at step 304. This step preferably includes the client application querying an application program interface associated with a communication protocol stack of the wireless device in order to obtain the data rate information. The data rate information may have been obtained by the communication protocol stack directly from a baseband transceiver of the wireless device. In some embodiments, the communication protocol stack may include a protocol to negotiate a desired QOS (quality of service). The QOS protocol component may then provide the data rate information.

In an alternative embodiment, the data rate information for the radio frequency connection may be obtained from the base transceiver station. In this embodiment, the wireless device transmits a data rate query message from the communication protocol stack to a base station transceiver messaging entity, and then receives a response message containing the data rate information.

The method 300 then provides the data rate information to a client application, such as by the communication protocol stack returning a data rate value to the client application in response to the query.

At step 306, the client application then transmits the data rate information to a media server. This may be done by including the data rate in an HTTP message, such as in a URL (uniform resource locator) request. Alternatively, messages formatted in XML, or any suitable message or data request format may be used.

The media server then provides media content to the wireless device in step 308, where the media content is based in part on the data rate information. That is, the media server may select for transmission one of plurality of available data streams or files, based on the data throughput available to the wireless device. Exemplary media types include AM radio quality audio, FM radio quality audio, and CD quality audio. Alternatively, the media types may be video having a frame rate of less than five frames per second and video having a frame rate of greater than five frames per second. Further alternatives may include video slides, video having a frame rate of between five and ten frames per second, and video having a frame rate of greater than ten frames per second.

Alternatively, the media server may generate a derivative of the media content that may be transmitted over the communication connection. For example, the media server may select a video compression rate and generate video on-the-fly from a streaming video source to transmit to the wireless device.

Table I below shows the results from the RF API query. The data rate information may be represented as low, medium, and high, or may have further gradations in quality. In practice, the data rate information may also be simple integers or bit strings representative of the data rate. In particular, two integers may be used, where one integer is indicative of the data rate, and the second one indicates a time duration for which the data rate is valid. The information may be stored in memory on the client device, in which case the client API may just read the memory locations to obtain the data rate information.

In Table I, Low bandwidth only allows the user to see a slide show or hear AM radio quality, Medium bandwidth provides video at 5 to 10 frames per second (fps) video or FM radio quality radio, High bandwidth allows for 10 to 15 fps video or CD quality radio. Previously, a user would attempt to stream a high bandwidth video while the network was assigning a low bandwidth channel, resulting in a bad video viewing experience.

TABLE I

| RF API Data Rate Query | Streaming Video | Streaming Audio |
| --- | --- | --- |
| Low | Slide show | AM Quality |
| Medium | 5 to 10 fps | FM Quality |
| High | 10 to 15 fps | CD Quality |

Figure 4:
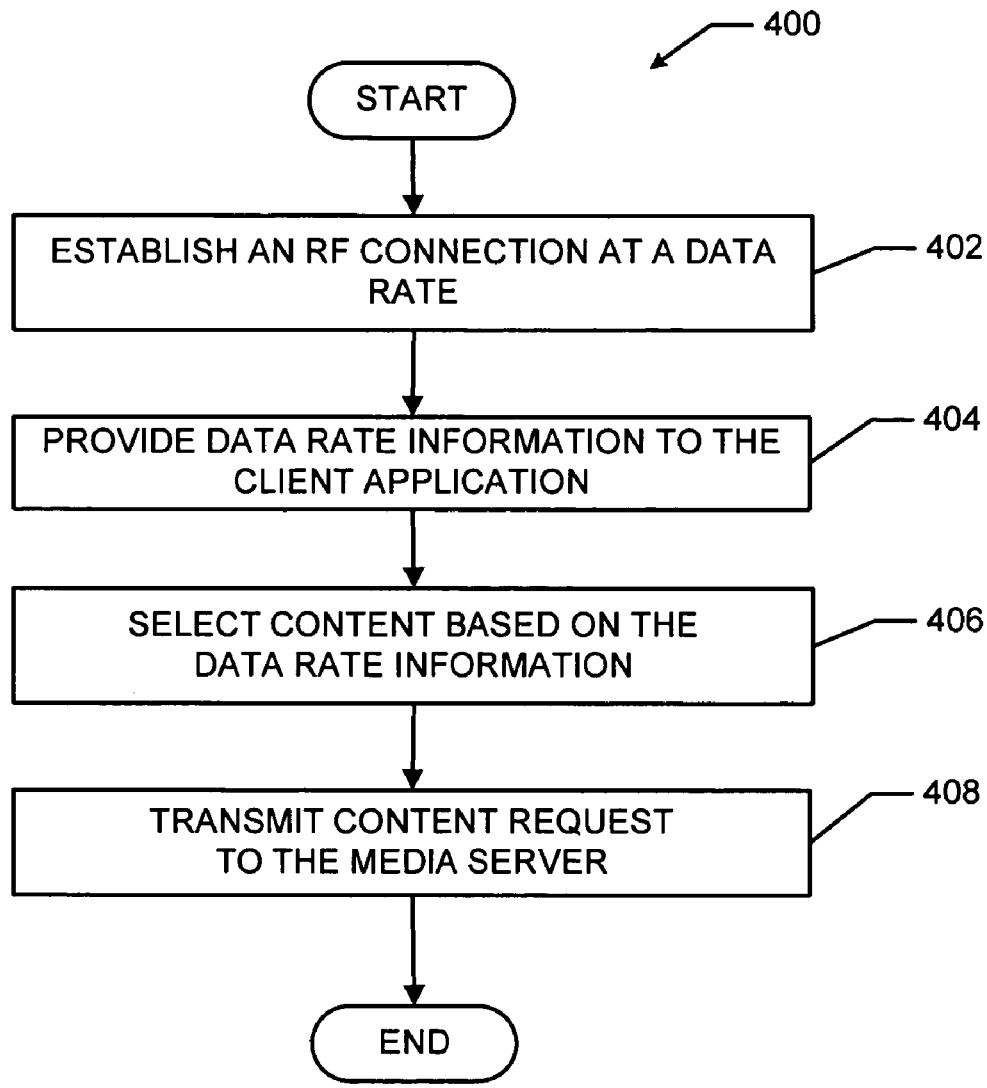

Alternatively, the client application may select a media type based on the data rate information. The method 400 is shown in FIG. 4. In this embodiment, the steps 402 and 404 are the same as steps 302 and 304 described above. At step 406, however, the client application on the wireless device uses the data rate information to select desired content, rather than sending the information to the media server and allowing the server to make the selection. The client application makes the selection based on the available data rate. The media selection is then transmitted the media server at step 408, and may take the form of an HTTP request, and XML request, or other suitable communication protocol.

Figure 5:
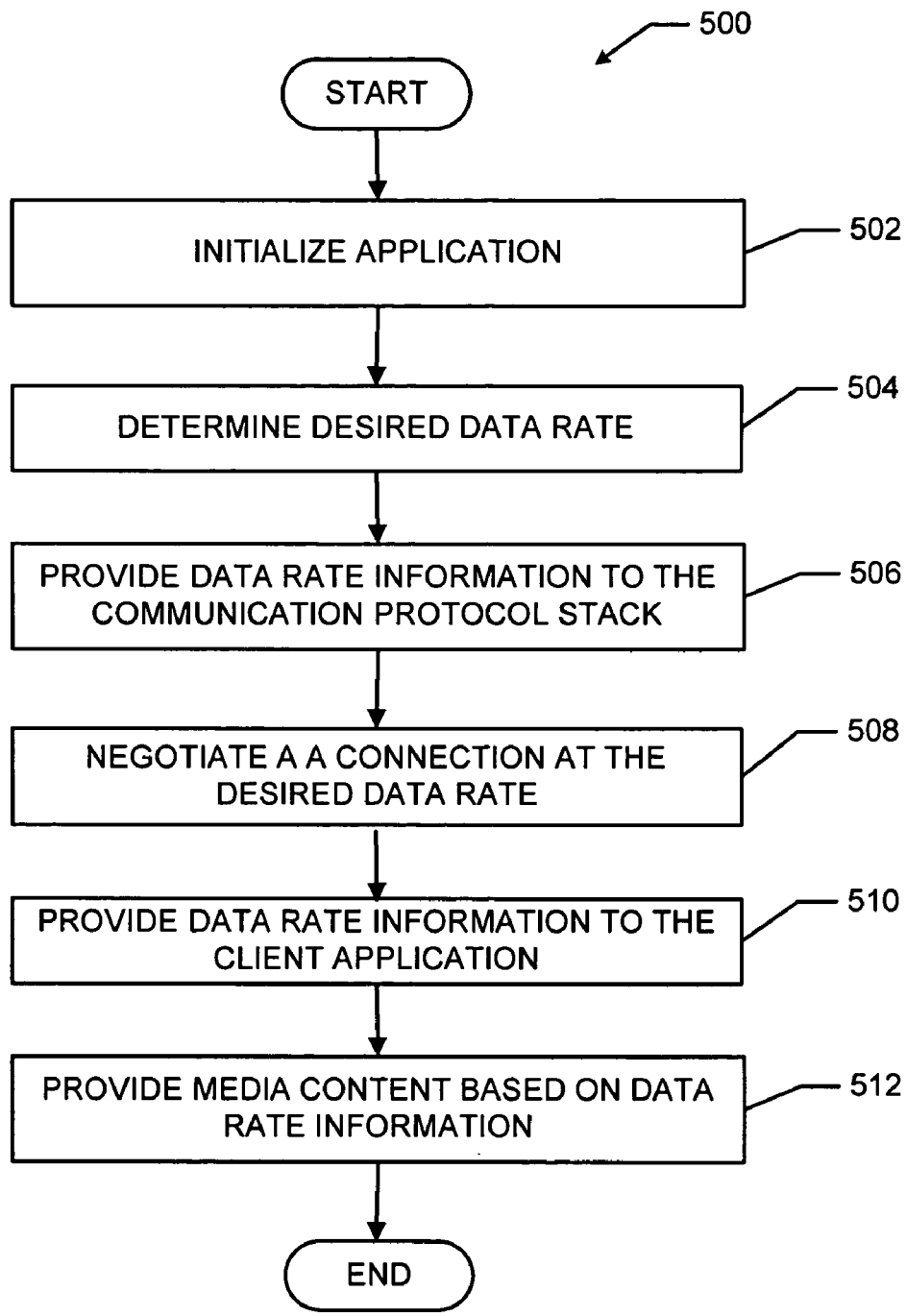

In a further embodiment, described with reference to FIG. 5, the method 500 includes negotiating a data rate to be used on a radio channel based on the requirements of an application program. In this embodiment, the method begins at step 502, where the client application is initialized on a wireless device. The application may be a stream audio or video application. Initialization may be done by first starting the program, or by selecting an option from within the application to obtain certain data. At step 504, the application determines a desired data rate required, or preferred, that should be available to support the application. At step 506, the data rate information indicative of the desired data rate is provided to the communication protocol stack.

At step 508, the communication protocol stack responsively establishes a radio connection using a radio transceiver at an available data rate nearest to the desired data rate. It should be noted that this step may also include renegotiating an existing connection to obtain a higher data rate. In some embodiments, this is implemented by a function call from the client application that notifies the transceiver (via the communication stack) to reactivate the QOS negotiation, and the application would wait for an update QOS. If the requested data rate negotiation fails, the client application may provide a notice to the user that there is not enough data for the application, and to try again later. Having a data rate verification of this type prevents a streaming application form playing when the data throughput it requires over the radio link is not available. If an unsupportable multimedia flow from the IP core network was not deferred, this normally would cause radio network congestion errors and a bad user experience.

In some embodiments, the method may include a Client request for a decrease in the RF data rate channel. This is useful when a user chooses a specific application that does not require the amount of data throughput currently assigned to the user. This allows the application to request a decrease for its current application data rate and to free up bandwidth for other users.

At step 510, the data rate information indicative of the available rate at which the radio connection was established is provided to the client application. Finally, at step 512, the media content is provided to the wireless device, wherein the media content is based in part on the data rate information.

As above, the media content may be selected by the client application by formulating an appropriate data request. Alternatively, the client application may provide the data rate information to the media server, and the media server may select (or generate) the appropriate content in response to the data rate information.

Those skilled in the art to which the present invention pertains may make modifications resulting in other embodiments employing principles of the present invention without departing from its spirit or characteristics. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications apparent to those skilled in the art would still fall within the scope of the invention.

We claim:

1. A method of optimizing data transmissions to a wireless device from a media server at a remote network node, comprising the steps of:
   establishing a radio frequency connection between the wireless device and a base station as an intermediary to the remote network node, wherein the radio frequency connection has a data rate corresponding to a predetermined level of quality of service;
   determining data rate information indicative of the data rate residing in one endpoint of the established radio frequency connection;
   providing the data rate information to a client application in the wireless device; and
   providing media content from the media server to the wireless device, wherein the media content is based in part on the data rate information;
   wherein the step of providing media content from the media server to the wireless device comprises selecting one of a plurality of media types in response to the data rate information, and wherein the media types include video having a frame rate of less than five frames per second and video having a frame rate of greater than five frames per second.

2. The method of claim 1 wherein the step of determining data rate information comprises the client application querying an application program interface associated with a communication protocol stack of the wireless device.

3. The method of claim 2 wherein a baseband transceiver of the wireless device provides the data rate information to the communication protocol stack.

4. The method of claim 2 wherein the communication protocol stack includes a protocol to negotiate a desired quality of service, and wherein the desired quality of service includes the data rate information.

5. The method of claim 2 wherein the step of determining data rate information for the radio frequency connection further comprises the steps of transmitting a data rate query message from the communication protocol stack to a base station transceiver messaging entity in the base station, and receiving a response message containing the data rate information.

6. The method of claim 5 wherein the communication protocol stack causes a data rate query message to be transmitted to a base transceiver station messaging entity, in the base station.

7. The method of claim 2 wherein the step of providing the data rate information to a client application comprises the communication protocol stack returning a data rate value to the client application in response to the client application query.

8. The method of claim 1 wherein the media types include video slides, video having a frame rate of between five and ten frames per second, and video having a frame rate of greater than ten frames per second.

9. The method of claim 1 wherein the client application selects the media type.

10. The method of claim 1 further comprising the steps of:
    the client application transmitting the data rate information to the media server, and the media server selecting the media type.

11. A method of optimizing data transmissions to a wireless device from a media server at a remote network node, comprising the steps of:
    initializing an application on the wireless device;
    determining a desired data rate to support the application;

providing data rate information indicative of the desired date rate to a communication protocol stack;

the communication protocol stack responsively establishing a radio connection between the wireless device and a base station using a radio transceiver at an available data rate nearest to the desired data rate;

providing data rate information indicative of the available rate a which the radio connection was established to application; and, providing media content from the media server to the wireless device using the established radio connection, wherein the media content is based in part on the data rate information;

wherein the step of providing media content to the wireless device comprises selecting one of a plurality of media types in response to the data rate information, and wherein the media types include video having a frame rate of less than five frames per second and video having a frame rate of greater than five frames per second.

12. The method of claim 11 wherein the application program is a streaming video player.

13. The method of claim 11 wherein the media types include video slides, video having a frame rate of between five and ten frames per second, and video having a frame rate of greater than ten frames per second.

14. The method of claim 11 wherein the selection of the media type is performed by the client application.

15. The method of claim 11 wherein the selection of the media type is performed by the media server.

* * * * *

UNITED STATES PATENT AND TRADEMARK OFFICE
CERTIFICATE OF CORRECTION

PATENT NO. : 7,664,832 B1
APPLICATION NO. : 10/961764
DATED : February 16, 2010
INVENTOR(S) : Ulvenes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1218 days.

Signed and Sealed this

Twenty-eighth Day of December, 2010

David J. Kappos
*Director of the United States Patent and Trademark Office*